(12) United States Patent
Muramatsu

(10) Patent No.: US 6,823,973 B2
(45) Date of Patent: Nov. 30, 2004

(54) RATCHET ONE-WAY CLUTCH AND STATOR USING RATCHET ONE-WAY CLUTCH

(75) Inventor: Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/195,401

(22) Filed: Jul. 16, 2002

(65) Prior Publication Data

US 2003/0034219 A1 Feb. 20, 2003

(30) Foreign Application Priority Data

Jul. 17, 2001 (JP) ........................................ 2001-216678

(51) Int. Cl.⁷ ........................ F16H 41/24; F16D 41/069
(52) U.S. Cl. ........................ 192/46; 60/345; 192/110 B
(58) Field of Search ..................... 192/46, 45.1, 110 B, 192/113.32; 60/345

(56) References Cited

U.S. PATENT DOCUMENTS 4,441,315 A * 4/1984 Bochot ........................ 60/345
5,632,363 A * 5/1997 Kubo et al. ................. 192/45.1
5,855,263 A * 1/1999 Fergle .......................... 192/46
5,947,245 A * 9/1999 Costin et al. ................. 192/46
6,338,403 B1 * 1/2002 Costin et al. ................. 192/46
6,557,681 B2 * 5/2003 Kinoshita et al. ............. 192/46
6,575,275 B2 * 6/2003 Muramatsu et al. .......... 192/46

* cited by examiner

Primary Examiner—Rodney H. Bonck
(74) Attorney, Agent, or Firm—Miles & Stockbridge P.C.

(57) ABSTRACT

A stator using a ratchet one-way clutch including an inner race having concave portions on the outer periphery thereof, a claw member to be fitted into one of the concave portions on the outer periphery of the inner race, a spring biasing the claw member toward the outer periphery of the inner race, and an outer race having on the inner periphery thereof a pocket receiving therein the claw member and the spring and arranged so as to be concentric with and rotatable relative to the inner race, wherein at least one of the inner race and the outer race has a bearing function.

4 Claims, 3 Drawing Sheets

RATCHET ONE-WAY CLUTCH AND STATOR USING RATCHET ONE-WAY CLUTCH

BACKGROUND OF THE INVENTION

1. Field of the Invention

The present invention relates to a ratchet one-way clutch and a stator using the ratchet one-way clutch for use in an automatic transmission, constructional machinery, agricultural machinery or the like.

2. Description of the Related Art

FIG. 4 is a partially sectional view, taken in a radial direction, of a stator 61 provided with a conventional sprag one-way clutch.

A structure of the stator 61 will be explained hereinbelow. The stator 61 comprises an impeller 67, a one-way clutch 50 arranged on the inner peripheral side of the impeller 67, and a bush 80. Both axial ends of the one-way clutch 50 are supported by an inner radial portion 74 of the impeller 67 and the bush 80. Further, both axial ends of the stator 61 are rotatably supported by a pair of thrust needle bearings 71 and 74.

The sprag one-way clutch 50 assembled in the stator 61 comprises an inner race 52, an outer race 53 arranged so as to be rotatable relative to and concentric with the inner race 52, a plurality of sprags 54 arranged in an annular space defined by the inner race 52 and the outer race 53 for transmitting torque, a ribbon spring 55 rockably retaining the sprags 54 at regular intervals in a circumferential direction and biasing them in a meshing direction, and annular retainers 56 and 58 retaining the ribbon spring 55.

The bush 80 is a member serving as a bearing of the inner race 52 and the outer race 53, and is formed on the axially inner side thereof with an inner shoulder 81 and an outer shoulder 82 for receiving therein corners of the inner race 52 and the outer race 53, respectively. The inner race 52 slides on the inner shoulder 81. With the aid of both shoulders, the inner race 52 and the outer race 53 can be arranged concentrically with each other.

The stator 61 having the foregoing sprag one-way clutch transmits torque when a direction of relative rotation between the inner race 52 and the outer race 53 agrees with a meshing direction of the sprags 54, while it idles and thus does not transmit torque in case of a non-meshing direction of the sprags 54.

SUMMARY OF THE INVENTION

In recent years, the development has been active for reducing size, weight and cost of automobile parts such as an automatic transmission, and a one-way clutch is not exceptional. There has been proposed a ratchet one-way clutch responding to such a demand.

It is an object of the present invention to provide a ratchet one-way clutch which is reduced in the number of parts, reduced in size and improved in dimensional accuracy, and further provide a stator using such a ratchet one-way clutch. More specifically, it is an object of the present invention to provide a one-way clutch of a structure omitting the bush which has been required in the foregoing conventional one-way clutch, and further provide a stator using such a one-way clutch.

For accomplishing the foregoing objects, a ratchet one-way clutch according to the first aspect of the present invention comprises an inner race; an outer race arranged so as to be concentric with and rotatable relative to the inner race; concave portions formed along a circumferential direction on one of an outer periphery of the inner race and an inner periphery of the outer race; and a claw member to be fitted into one of the concave portions, a spring biasing the claw member relative to the concave portions, and a pocket formed on the other of the outer periphery of the inner race and the inner periphery of the outer race and receiving therein the claw member and the spring, wherein at least one of the inner race and the outer race has a bearing function.

In a ratchet one-way clutch according to another aspect of the present invention, a bearing portion is formed on at least one of the inner race and the outer race for allowing mutual sliding movement therebetween, and a predetermined clearance is provided between the inner race and the outer race.

In a ratchet one-way clutch according to another aspect of the present invention, the outer race is made of aluminum.

In a ratchet one-way clutch according to another aspect of the present invention, a projection for supporting the claw member axially is provided within the pocket.

A stator of the present invention uses any one of the foregoing ratchet one-way clutches.

DESCRIPTION OF THE PREFERRED EMBODIMENTS

In this embodiment, there is formed a ratchet one-way clutch comprising an inner race, an outer race arranged so as to be concentric with and rotatable relative to the inner race, concave portions formed along a circumferential direction on one of an outer periphery of the inner race and an inner periphery of the outer race, a claw member to be fitted into one of the concave portions, a spring biasing the claw member relative to the concave portions, and a pocket formed on the other of the outer periphery of the inner race and the inner periphery of the outer race and receiving therein the claw member and the spring, wherein the inner race and the outer race are formed of mutually slidable members and provided with a predetermined clearance interposed therebetween, thereby to form a bearing function. This bearing function serves as a slide bearing.

The phrase "at least one of the inner race and the outer race has a bearing function" in the foregoing first aspect of the present invention represents that at least one of the inner race and the outer race is formed of a sliding member made of aluminum, phosphor bronze, lead, copper lead or the like which is used in the slide bearing, or that a sliding surface of at least one of the inner race and the outer race is coated or cast-molded with aluminum, phosphor bronze, lead, copper lead or the like, and that a clearance appropriate for the slide bearing is provided between the inner race and the outer race.

Embodiment

Figure 1:
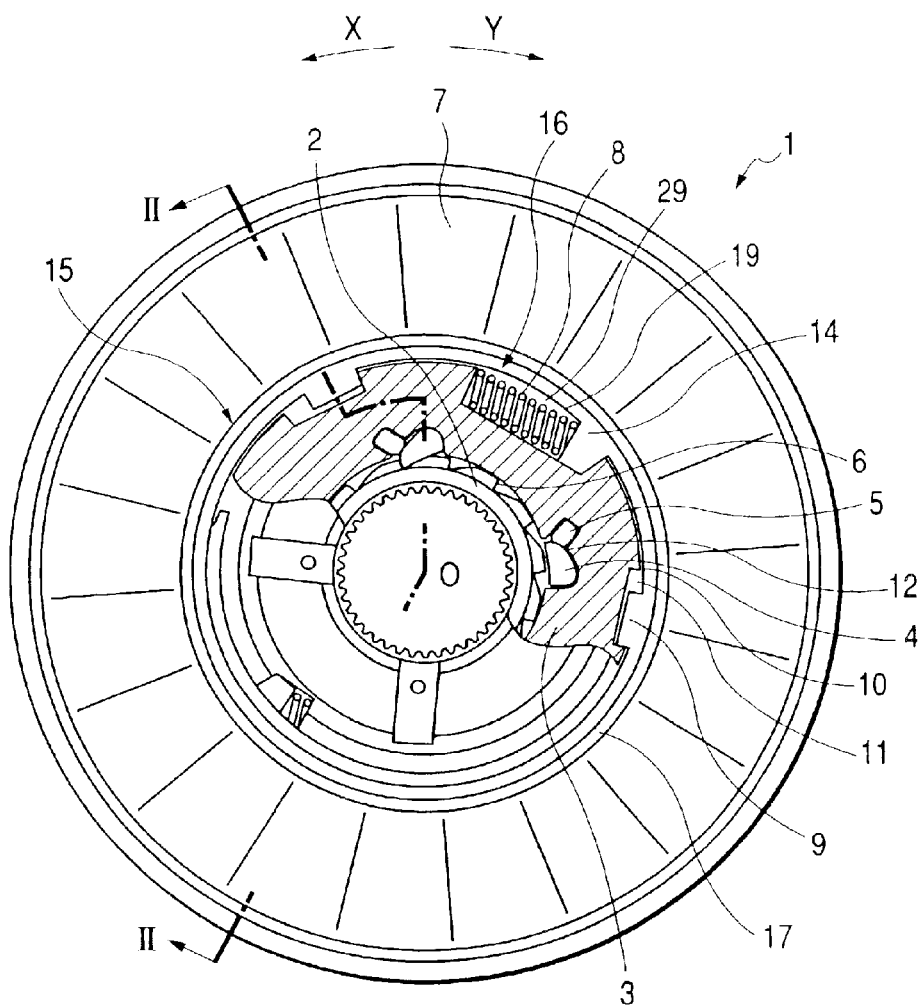
FIG. 1 is a partially sectional view as seen from the front of an embodiment of the present invention.
Figure 2:
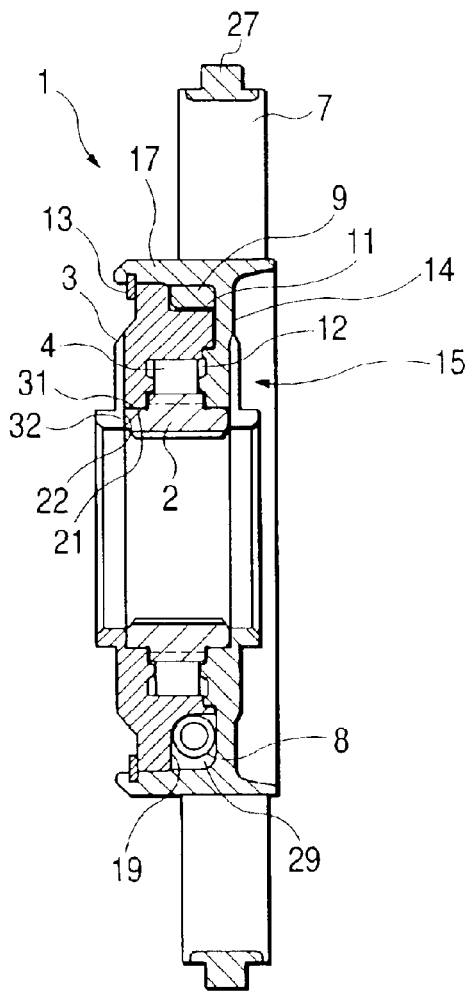
FIG. 2 is a sectional view taken along line II-O-II of FIG. 1.
Figure 3:
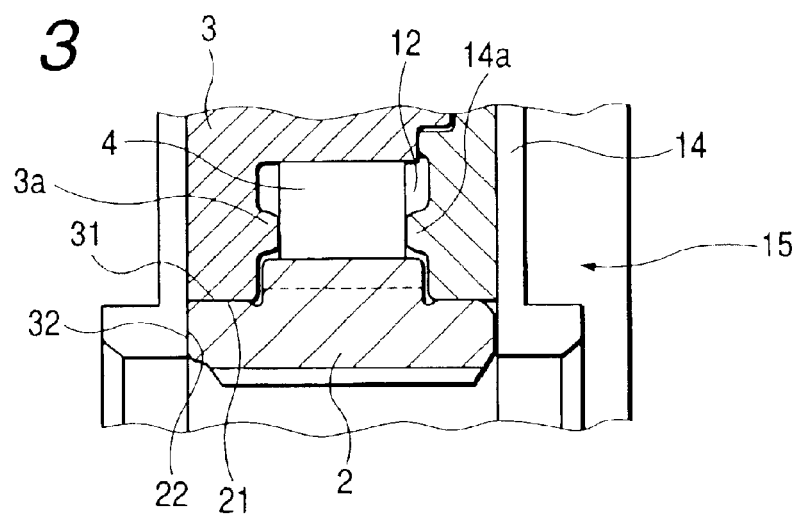
FIG. 3 is a partially enlarged view of FIG. 2.

FIGS. 1 to 3 show an embodiment of the present invention. FIG. 1 is a partially sectional front view of a stator, FIG. 2 is a sectional view taken along line II-O-II of FIG. 1, and FIG. 3 is a partially enlarged view of FIG. 2.

A stator 1 comprises an impeller 7, a ratchet one-way clutch 15 disposed on the inner peripheral side of the impeller 7, and a damper mechanism 16 provided between the impeller 7 and the one-way clutch 15.

First, the ratchet one-way clutch 15 arranged within an inner ring 17 of the impeller 7 will be described.

The ratchet one-way clutch 15 comprises an inner race 2 connectable to a stator shaft (not shown) by spline coupling, and an outer race 3 arranged on the outer peripheral side of the inner race 2 so as to be concentric with and rotatable relative to the inner race 2. The inner race 2 is formed on the outer periphery thereof with concave portions 6 arranged circumferentially, i.e. along a circumferential direction, at regular intervals, and claw members 4 disposed in pockets 12 provided on the inner peripheral side of the outer race 3 engage with the concave portions 6. Further, in each pocket 12, a spring 5 is disposed for biasing the claw member 4 relative to the outer periphery of the inner race 2.

With the foregoing arrangement, when the inner race 2 rotates leftward (in a direction of arrow X), or when the outer race 3 rotates rightward (in a direction of arrow Y), the claw members 4 are not fitted into the concave portions 6 of the inner race 2 so that the ratchet one-way clutch 15 idles.

On the other hand, when the inner race 2 rotates rightward (in the direction of arrow Y), or when the outer race 3 rotates leftward (in the direction of arrow X), the claw members 4 are fitted into the concave portions 6 so that torque is transmitted between the inner race 2 and the outer race 3.

Now, the damper mechanism 16 for absorbing a shock which is generated when the claw members 4 are fitted into the concave portions 6 in the one-way clutch 15, will be described. The outer race 3 is formed on the outer periphery thereof with first concave portions 19 arranged circumferentially at regular intervals for receiving therein damper springs 8, respectively. The impeller 7 is formed on the inner periphery thereof with concave portions 29 arranged circumferentially at regular intervals, i.e. correspondingly to the first concave portions 19. Each damper spring 8 extends circumferentially with its one end abuttable with a side wall, substantially perpendicular to a circumferential direction, of the first concave portion 19 of the outer race 3, and with its other end abuttable with a side wall, substantially perpendicular to a circumferential direction, of the concave portion 29 of the impeller 7.

Further, the outer race 3 is formed on the outer periphery thereof with second concave portions 10 into which convex portions 9 provided on the inner periphery of the inner ring 17 project, respectively. The convex portion 9 and the second concave portion 10 are complementary in shape to each other. The circumferential length of the second concave portion 10 is set greater than that of the convex portion 9, while is set smaller than that of the first concave portion 19. When the outer race 3 rotates relative to the impeller 7, each damper spring 8 contracts. However, before exceeding an allowable contraction magnitude of the damper spring 8, each convex portion 9 abuts against the second concave portion 10. Accordingly, the convex portion 9 and the second concave portion 10 cooperatively form a damper spring operation limit portion for limiting the contraction amount of the damper spring 8. By adjusting circumferential lengths of the convex portion 9 and the second concave portion 10, the contraction amount of the damper spring 8 can be determined. In the foregoing manner, the damper springs 8, the first concave portions 19 of the outer race 3 and the concave portions 29 of the impeller 7 constitute the damper mechanism 16.

With the foregoing arrangement, the shock, which is generated when the claw members 4 are fitted into the concave portions 6 of the inner race 2 in the one-way clutch 15, is transmitted to the damper springs 8 from the outer race 3 so as to be absorbed by the damper springs 8. Even if the shock generated when the claw members 4 are fitted into the concave portions 6 is too large to be absorbed by the damper springs 8, the second concave portions 10 of the outer race 3 are stopped by the convex portions 9 of the inner ring 17, so that the contraction amount of each damper spring 8 is limited. Accordingly, setting or breakage of the damper springs 8 can be prevented.

The structure of the stator 1 will be further described with reference to FIG. 2. FIG. 2 is a sectional view of the stator 1, taken along line II-O-II in FIG. 1.

As shown in the figure, an inner radial portion 14 extends radially inward from the inner ring 17 of the impeller 7, so that the inner race 2 is sandwiched axially between the inner radial portion 14 and the outer race 3. Specifically, the outer race 3 and the inner radial portion 14 abut with both axial ends of the inner race 2. On the other hand, the inner race 2 is disposed with clearances for allowing the inner race 2 to slide relative to the outer race 3 and the inner radial portion 14. In this embodiment, the outer race 3 and the inner radial portion 14 are made of aluminum.

In the one-way clutch 15, a bearing portion for the inner race 2 is provided on the outer race 3. The conventional bearing member (bush 80, see FIG. 4), which was provided as a separate member, is not interposed between the inner race 2 and the outer race 3.

An axial end surface (sliding surface) 32 of the inner race 2 abuts with an inner side surface (sliding surface) 22 of the outer race 3, and an outer periphery (sliding surface) 31 of the inner race 2 abuts with an inner periphery (sliding surface) 21 of the outer race 3. The inner race 2 and the outer race 3 are formed slidable to each other, and are disposed with given clearances interposed therebetween.

Movement of the outer race 3, constituting the one-way clutch 15, in one axial direction (leftward in FIG. 2) is regulated by a snap ring 13 fitted into a groove formed on the inner periphery of the inner ring 17. Further, movement of the outer race 3 in the other axial direction (rightward in FIG. 2) is regulated by the inner radial portion 14.

The damper mechanism is shown at the lower part of FIG. 2. The first concave portion 19 of the outer race 3 is defined by, in a cross section, a surface extending axially, a surface extending radially, and a curved surface with a given radius of curvature connecting such two surfaces.

Similarly, the concave portion 29 of the impeller 7 constituting the damper mechanism 16 is also defined by, in a cross section, a surface extending axially, a surface extending radially, and a curved surface with a given radius of curvature connecting such two surfaces.

It is desirable that the radius of curvature of each of the curved surfaces forming the first concave portion 19 and the concave portion 29 agrees with a radius of curvature of the damper spring 8 received therein. This can provide smooth contraction of the damper spring 8.

The structures of the inner race 2 and the outer race 3 will be further described in detail with reference to FIG. 3. FIG. 3 is a partially enlarged view of FIG. 2. As described above, the axial end surface 32 of the inner race 2 abuts with the inner side surface 22 of the outer race 3, and the outer periphery 31 of the inner race 2 abuts with the inner periphery 21 of the outer race 3. Given clearances are provided between the inner race 2 and the outer race 3 in the axial and radial directions for mutual sliding movement thereof, thereby to form a slide bearing. The inner side surface 22 and the inner periphery 21 of the outer race 3 form a radial bearing surface and a thrust bearing surface, respectively.

Further, the inner radial portion 14 of the impeller 7 has projections 14a projecting axially at positions corresponding to the pockets 12 of the outer race 3, while the outer race 3 has projections 3a projecting axially within the pockets 12. By supporting the claw member 4 axially by means of both projections 14a and 3a so as to be rockable, friction between the claw member 4 and the pocket 12 can be reduced.

With the arrangement described above, the bearing member, such as the bush (member 80 in FIG. 4), used in the conventional stator can be omitted. As a result, the number of the parts of the stator can be reduced, and the size of the stator body can be diminished.

Further, in case of the conventional stator, it is necessary that dimensional tolerance is set between the bush and the inner race and between the bush and the outer race, and the stator is produced within that range. However, by adopting the foregoing arrangement, the stator can be produced within a range of dimensional tolerance only set between the inner race 2 and the outer race 3, so that the dimensional accuracy can be enhanced.

In this embodiment, the outer race 3 and the inner radial portion 14 are made of aluminum. However, the outer race 3 and the inner radial portion 14 may be made of other material, such as phosphor bronze, lead and copper lead. It is also possible to cast-mold such a material on the sliding surfaces thereof relative to the inner race 2.

As appreciated, it may also be arranged that the inner race, rather than or in addition to the outer race, is made of any one of those materials or has such a cast-molded sliding surface.

Figure 4:
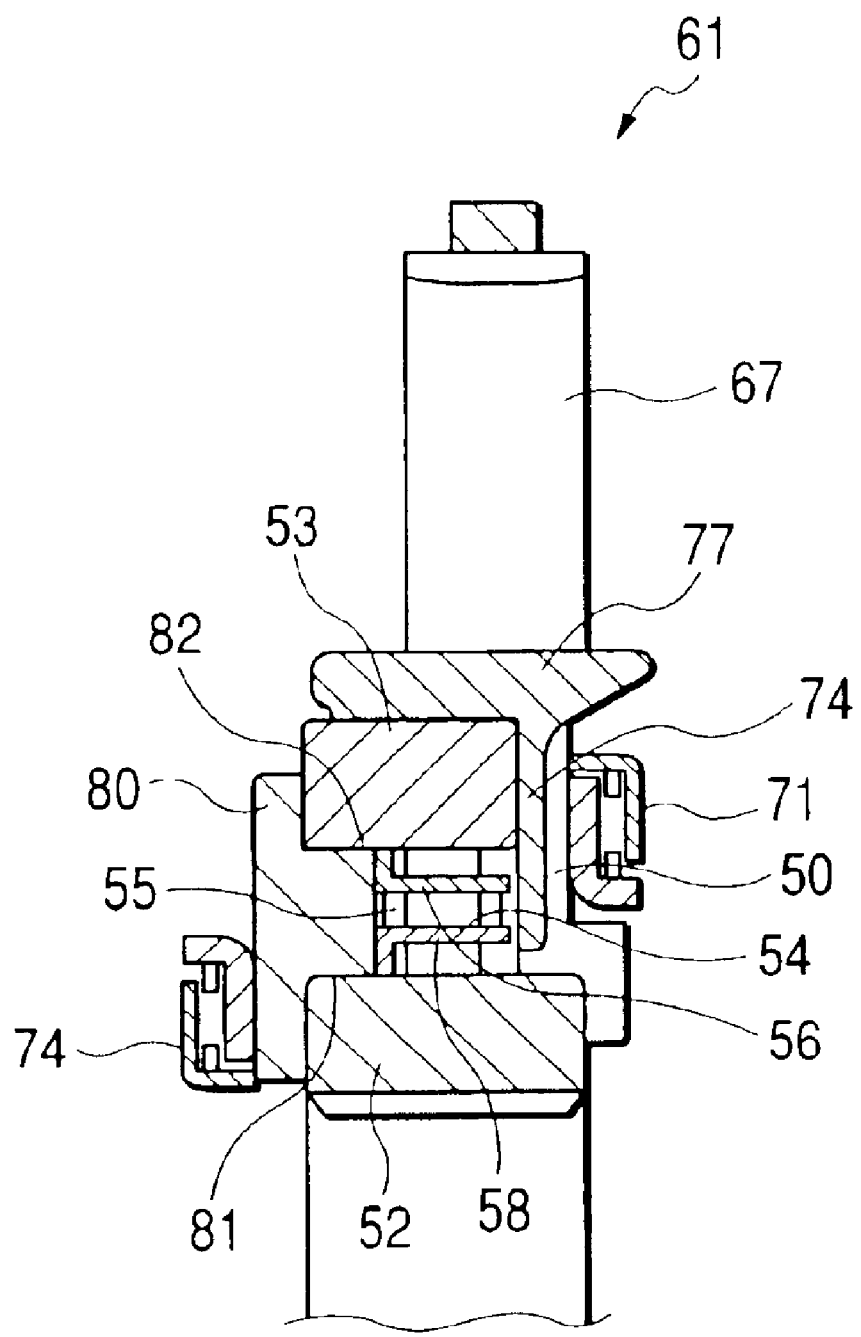
FIG. 4 is a diagram showing a conventional stator and one-way clutch.

In the structure shown in FIG. 2, the outer race 3 and the impeller 7 are assembled together by means of the snap ring 13, so that the number of the parts is not reduced as compared with the structure shown in FIG. 4. However, this is based on the addition of the damper mechanism 16. If such a mechanism is not provided, since the outer race and the bush are unified together, the number of the parts is reduced.

The present invention can be embodied in various ways without departing from the principle thereof. Accordingly, the foregoing embodiment is only for explanation and not for limiting the present invention.

According to the ratchet one-way clutch of the present invention, the bush is not used and at least one of the inner race and the outer race has a bearing function. Thus, it is possible to reduce the number of the parts and the size, and further enhance the dimensional accuracy because it is sufficient to consider only the dimensional tolerance between the inner race and the outer race.

Since the ratchet one-way clutch is reduced in size and enhanced in dimensional accuracy as described above, the stator of the present invention can also be reduced in size and enhanced in dimensional accuracy.

What is claimed is:

1. A stator comprising:
    an impeller; and
    a one-way clutch disposed on an inner peripheral side of said impeller, the one-way clutch having:
        an outer race arranged so as to be concentric with the impeller;
        an inner race arranged so as to be concentric with the outer race and rotatable relative to said outer race;
        a concave portion formed along a circumferential direction on one of an outer periphery of said inner race and an inner periphery of said outer race;
        a claw member to be fitted into said concave portion, disposed on the other of said outer periphery of said inner race and said inner periphery of said outer race; and
    a spring biasing said claw member relative to said concave portion,
        wherein said impeller is provided with a first projection and said other periphery is provided with a second projection, with said first and second projections being opposed to each other so as to support said claw member axially.

2. A stator according to claim 1, wherein a bearing portion is formed on at least one of said inner race and said outer race for allowing mutual sliding movement therebetween, and a predetermined clearance is provided between said inner race and said outer race.

3. A ratchet one-way clutch stator according to claim 1, wherein said outer race is made of aluminum.

4. A stator according to claim 2, wherein said outer race is made of aluminum.

* * * * *

UNITED STATES PATENT AND TRADEMARK OFFICE
CERTIFICATE OF CORRECTION

PATENT NO. : 6,823,973 B2
DATED : November 30, 2004
INVENTOR(S) : Kazuhiko Muramatsu It is certified that error appears in the above-identified patent and that said Letters Patent is hereby corrected as shown below:

<u>Column 6,</u>
Line 38, should read -- A stator according to claim 1, wherein said outer race is made of aluminum. --.

Signed and Sealed this

Thirtieth Day of August, 2005

JON W. DUDAS
*Director of the United States Patent and Trademark Office*